(12) United States Patent
Wolowelsky et al.

(10) Patent No.: US 7,180,536 B2
(45) Date of Patent: Feb. 20, 2007

(54) METHOD FOR PRODUCING STEREOSCOPIC IMAGES FROM MONOSCOPIC IMAGES

(75) Inventors: Karni Wolowelsky, Misgav (IL); Efrat Rotem, Haifa (IL)

(73) Assignee: Raphael-Armament Development Authority Ltd., Haifa (IL)

( * ) Notice: Subject to any disclaimer, the term of this patent is extended or adjusted under 35 U.S.C. 154(b) by 0 days.

(21) Appl. No.: 10/517,557

(22) PCT Filed: May 26, 2003

(86) PCT No.: PCT/IL03/00436

§ 371 (c)(1),
(2), (4) Date: Aug. 8, 2005

(87) PCT Pub. No.: WO03/105491

PCT Pub. Date: Dec. 18, 2003

(65) Prior Publication Data

US 2006/0092272 A1 May 4, 2006

(30) Foreign Application Priority Data

Jun. 10, 2002 (IL) .................................... 150131

(51) Int. Cl.
*H04N 13/00* (2006.01)
*H04N 15/00* (2006.01)

(52) U.S. Cl. ....................................................... 348/42
(58) Field of Classification Search ..................... None
See application file for complete search history.

(56) References Cited

U.S. PATENT DOCUMENTS 4,925,294 A 5/1990 Geshwind et al.
5,581,638 A * 12/1996 Givens et al. .............. 382/294
6,215,516 B1 * 4/2001 Ma et al. ....................... 348/43
6,314,211 B1 11/2001 Kim et al.
6,496,598 B1 * 12/2002 Harman ...................... 382/154
7,088,364 B2 * 8/2006 Lantin ......................... 345/427

FOREIGN PATENT DOCUMENTS

EP          735512        10/1996
WO     WO 00/39995       7/2000

OTHER PUBLICATIONS

Zhang, X. et al: "Visual Video Image. . . Technique" IEICE Transactions on Information and Systems, Institute of Electronics Information and Comm. Eng. Tokyo, JP, vol. E83-D, No. 6, Jun. 2000, pp. 1266-73: XP000976220.
Brown, Lisa G., "A Survey of Image Registration Technology", ACM Computing Surveys, Dec. 1992, vol. 24, No. 4, pp. 325-376.
Burt, P.J. et. al., Object Tracking With Moving Camera, in Proceedings IEEE Workshop on Visual Motion 1989, pp. 2-12.
Zhu Z. et al.., "Parallel-Perspective Stereo Mosaics" Department of Computer Science, University of Massachusetts at Amherst, MA 01003.

* cited by examiner

*Primary Examiner*—Nhon Diep
(74) *Attorney, Agent, or Firm*—Gottlieb, Rackman & Reisman

(57) ABSTRACT

The invention provides a method for producing a series of stereoscopic pairs of images that can be displayed one after the other as a stereoscopic movie. The sequence of stereoscopic pairs is derived from a sequence of consecutive images of a scene that is obtained by standard techniques using standard equipment. A first image of a pair of images comprising the right and left images of each frame of the stereoscopic series of images is selected from the original sequence of images. Its stereo partner is either selected from the original sequence and/or is generated by transforming images selected from the original sequence of images.

14 Claims, 7 Drawing Sheets

1050

1051

1052

1053

1054

1055

1054

1050

1054w

1050

1051

1052

1053

1054

1055

METHOD FOR PRODUCING STEREOSCOPIC IMAGES FROM MONOSCOPIC IMAGES

FIELD OF THE INVENTION

The present invention relates to the field of stereoscopic series of images. More specifically the invention relates to a process for producing stereoscopic series of images from a series of consecutive two-dimensional images of a scene, the images being acquired with a standard non-stabilized camera.

BACKGROUND OF THE INVENTION

Stereoscopic, or three-dimensional, photography is based on the principle of human vision. Two separate detectors (the eyes) detect the same object from slightly different angles and project them onto two planes (the retinas). The resulting images are transferred to a processor (the brain) which combines them and gives the perception of the third dimension, i.e. depth, to the scene.

Since the first practical demonstration of a stereoscope by Wheatstone in 1838, many different methods of creating and displaying stereo images have been developed. Most are hardware based methods such as using two cameras with a fixed relation between them or a single camera with two lenses to photograph a scene and produce the two slightly shifted images needed.

Similarly, many methods of viewing the stereoscopic images have been developed and include the use of colored or polarizing filters to separate the two images, temporal selection by successive transmission of the images using a shutter arrangement, or physical separation of the images in the viewer and projecting them separately to each eye. The last method was, on the one hand, the one originally used by Wheatstone and, on the other hand, employed in the latest virtual reality techniques.

The above mentioned methods of producing and viewing stereoscopic images and are well known in the art and need not be described in further detail herein.

Stereoscopic series of images are, in principle, nothing but a series of stereoscopic images that are viewed in succession. They are usually produced by means of series of images cameras with two slightly displaced lenses that record pairs of frames of images. Each frame shows the scene at a slightly different angle than its partner. In order to obtain a film in which the viewed action appears to flow continuously and naturally, the utmost stability is required during the photographing process. As a result, to date prior art stereoscopic series of images have been produced only by use of specially designed and stabilized cameras.

Methods of producing a seamless stereo pair of mosaics from a moving video camera have been developed by, for example, Peleg, et. al. [WO 00/39995] and Zhu, et. al. [Parallel-Perspective Stereo Mosaics, IEEC International Conference on Computer Vision, Vancouver, Canada, Jul. 2001, Vol. 1 pp. 345–352]. In order to produce three dimensional effects, according to these methods, matches are performed on the stereo mosaics and not on the individual video frames. These methods essentially take a video film and turn it into a static mosaic. The resulting views are static and don't give the viewer the feeling of motion of the camera that was contained in the original film.

To date, no method has been proposed to produce stereoscopic series of images from a video film produced by a hand held video camera. Also, in none of the existing methods is it possible to record an audio track together with the original series of images and to reproduce it with the resultant stereo images.

It is therefore a purpose of the present invention to provide a method of producing a stereoscopic movie from any series of consecutive images of a scene in which the conditions of parallax necessary for human vision exist.

It is another purpose of this invention to provide a method of producing stereoscopic movie from a series of consecutive images of a scene, the images being acquired without the use of specialized cameras, tripods, or stabilizing equipment.

Further purposes and advantages of the invention will appear as the description proceeds.

SUMMARY OF THE INVENTION

The present invention is directed to providing a method for taking a sequence of consecutive images of a scene and producing from these images a series of stereoscopic pairs that can be displayed one after the other as a stereoscopic movie. The sequence of images is obtained by standard techniques using standard equipment. The sequence of images can comprise frames taken with a video camera or a digital still camera, or analog images that are scanned to produce the digitized images. The analog images can be images taken with a still or movie camera. The pair of images comprising the right and left images of each frame of the stereoscopic series of images are either selected from the original sequence of images and/or generated by transforming images selected from the original sequence of images.

According to a preferred embodiment of the invention, the method of producing the sequence of stereo pairs comprises the following steps:

a) reading the original sequence of consecutive images of a scene with a device that is capable of digitizing the images, if necessary:

b) storing the digitized images in a memory unit;

c) selecting a subset of images of interest;

d) computing the collection of affine transformations between the images in the subset;

e) selecting one image of the sequence of the subset of images of a scene that will be one member of the first stereo pair of the sequence;

f) searching for a suitable stereo partner for said selected image by determining the cascaded affine transformation to each of the successive images starting with the neighboring image to said selected image and applying the parallax criterion until a suitable stereo partner, i.e. an image that can be transformed into the second member of said stereo pair is found;

g) calculating a planar transformation by using the members of said stereo pair and the cascaded affine transformation between the members of said pair;

h) applying said planar transformation to said suitable stereo partner;

i) storing said stereo pair in the memory unit; and j) repeating steps e) through h) for the next and each of the remaining images of said selected subset.

The parallax criterion is the number of pixels of horizontal translational motion between the image centers of the selected image and the image being considered as a possible stereo partner. The search in the original series of images for a suitable stereo partner for a selected image of the series is carried out amongst the neighboring images on both sides of the selected image and is limited to a predetermined maximum number of images on either side of the selected image.

A stereoscopic movie produced by the method of the invention can be accompanied by a sound track, which is essentially identical to the sound track recorded with the sequence of consecutive images.

All the above and other characteristics and advantages of the invention will be further understood through the following illustrative and non-limitative description of preferred embodiments thereof, with reference to the appended drawings.

DETAILED DESCRIPTION OF PREFERRED EMBODIMENTS

Definition: In this application, the terms "sequence of stereoscopic images" and "stereoscopic movie" are used interchangeably to mean a motion picture that represents the scene as recorded by the camera.

The purpose of the invention is to take a continuous sequence of digitized images of a scene and to produce from these images a series of stereoscopic pairs that can be displayed one after the other as a stereoscopic movie. The resulting sequence of stereoscopic images is displayed on a display device such as a television or computer screen, and its three-dimensional features are observed with the aid of conventional stereoscopic glasses. The original sequence of images is obtained by standard techniques using standard equipment and can comprise, for example, frames taken with a video camera or a digital still camera, or analog images that are scanned to produce the digitized images. The analog images can be images taken with a still or movie camera.

The method of the invention is highly automated and its various steps are carried out with a processor unit using known algorithms that familiar to persons skilled in computer vision.

In order to describe the method of the invention, we first consider an idealized example. In this case, the method is applied to a sequence of images from a video film photographed by a walking person using a commercial hand-held video camera.

Figure 1:
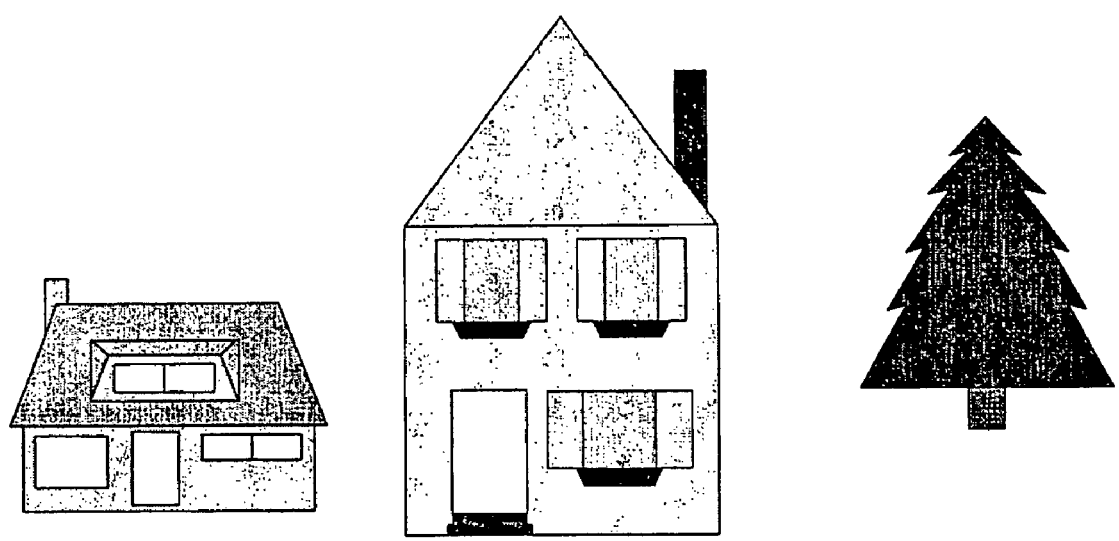
FIG. 1 shows a portion of the scene which the photographer records as he walks at a uniform rate.
Figure 2:
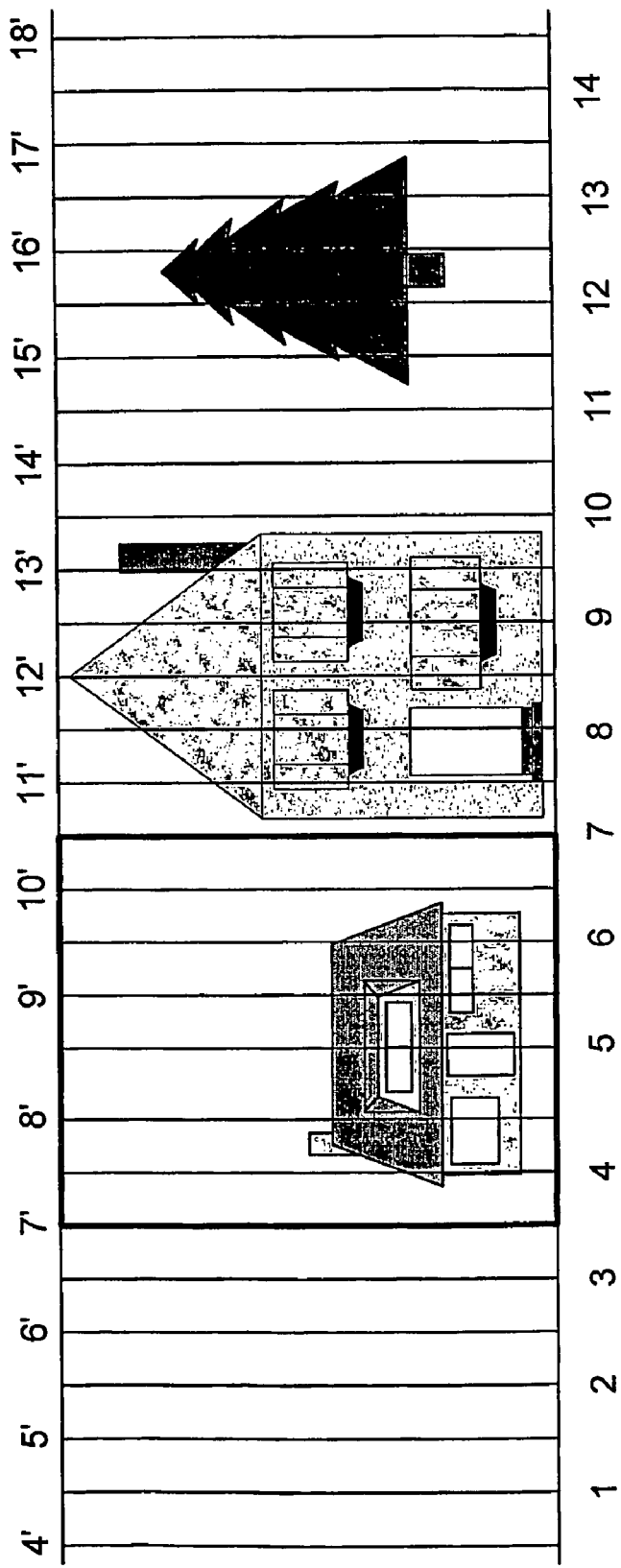
FIG. 2 shows schematically how the scene of FIG. 1 would appear on the film.
Figure 3A:
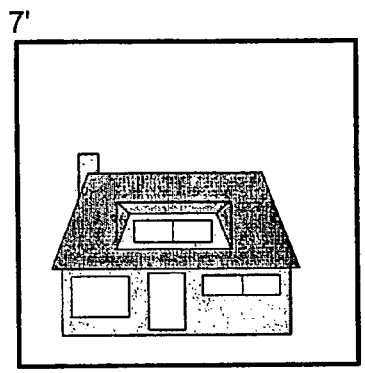
FIGS. 3A to 3F schematically show the information about the small house that is contained in each of the frames of FIG. 2.
Figure 3D:
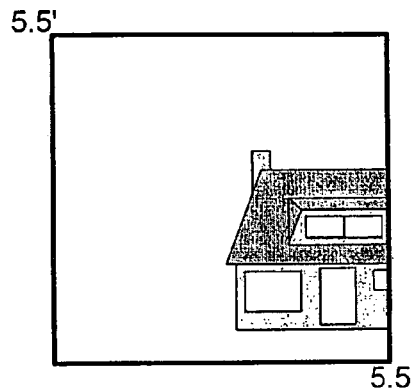
Figure 3B:
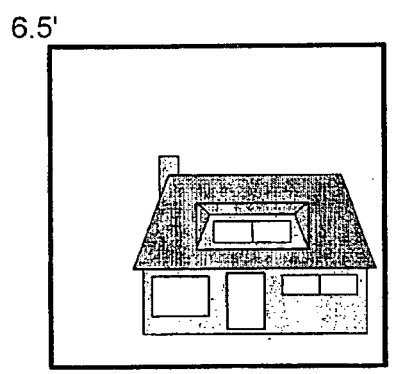
Figure 3E:
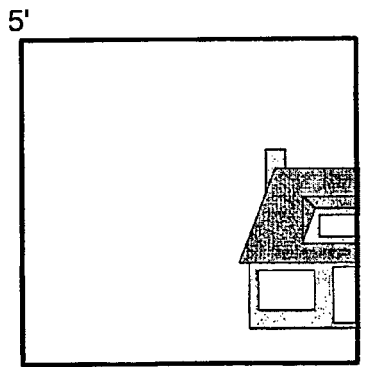
Figure 3C:
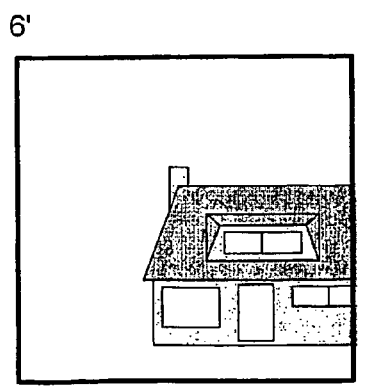
Figure 3F:
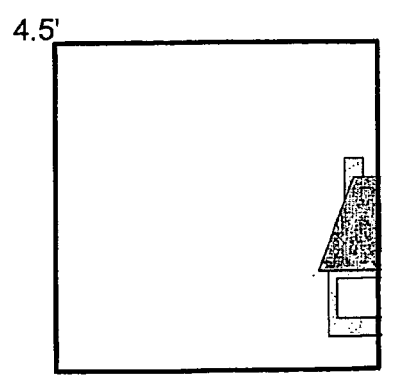

FIG. 1 shows a scene consisting of two houses and a tree which the photographer records as he walks along the street at a uniform rate. FIG. 2 shows schematically how the scene of FIG. 1 would appear on the film. A whole frame (frame 7) has been outlined in bold lines as an example. The consecutive frames are the images from which the stereoscopic series of images will be generated.

FIG. 2 shows an idealized situation in which the camera moves with constant velocity, i.e. the motion is linear translational motion at a constant speed. In this case, the frames of the film are aligned as shown with the right side of each frame designated by the numeral n and the corresponding left side by n'. In this idealization, an object, for example the small house, is entirely visible in two consecutive frames (7 and 8). A single feature of the same object, for example the right side of the door, appears in four frames (6–9) and a part of the object in six frames (5–10).

FIG. 2 does not take into account the fact that the scene being photographed is three-dimensional and is made up of three-dimensional objects. The three-dimensionality of the objects, combined with the fact that a real camera lens has a field of view, i.e. the width of the scene captured on the film is proportional, amongst other factors, to the distance between the objects and the focal length of the lens, means that each successive frame containing a given object contains a different amount of information about that object (unless of course the distance and orientation between lens and object have not changed from frame to frame). FIGS. 3A to 3F schematically show the different information about the small house that is contained in each of the frames of FIG. 2 in which at least part of the house is visible. FIGS. 3A to 3F show the scene as if it has no depth dimension. As discussed above, real objects in the scene are three-dimensional and therefore, for example, the frame shown in FIG. 3A would also include information about the left side of the house in an actual video film.

An actual video film would also differ from the ideal situation described above because of the non-uniformity and non-linearity of the motion of the camera that occurs under ordinary circumstances.

Figure 4A:
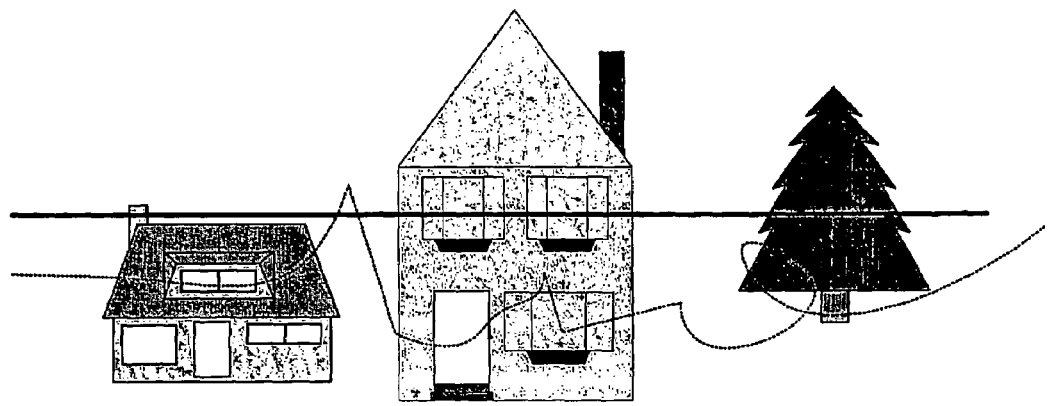
FIG. 4A schematically shows the intersection of the line-of-sight of the camera with the scene being photographed for the more realistic case.

In FIG. 4A is schematically shown the intersection of the line-of-sight of the camera with the scene being photographed for the idealized case of FIG. 2 (solid line) and a more realistic case (dotted line). In the realistic case, the line-of-sight of the camera moves irregularly for many reasons, some as a result of voluntary actions of the photographer some not under his control. One of the most important factors is the desire to record the most prominent and/or most interesting features in the scene. This desire will, for example, result in the lens being pointed downward when photographing the small house, raised abruptly to record the large house, and raised again to record the distant tree. Also the photographer might pause opposite the small house to record more details and then hurry past the large house but, after passing the tree turn his camera back to photograph the now visible side of the large house. In addition, the camera might be inadvertently and irregularly moved by the inability of the photographer to hold it steady, due to factors such as uneven terrain, tiredness, strong winds, etc. As an extreme example, the photographer might even stumble. It must also be remembered that all of the objects in a scene might not be motionless and attempts to track a moving object will also contribute to a non-uniform progression of frames across the scene.

Figure 4B:
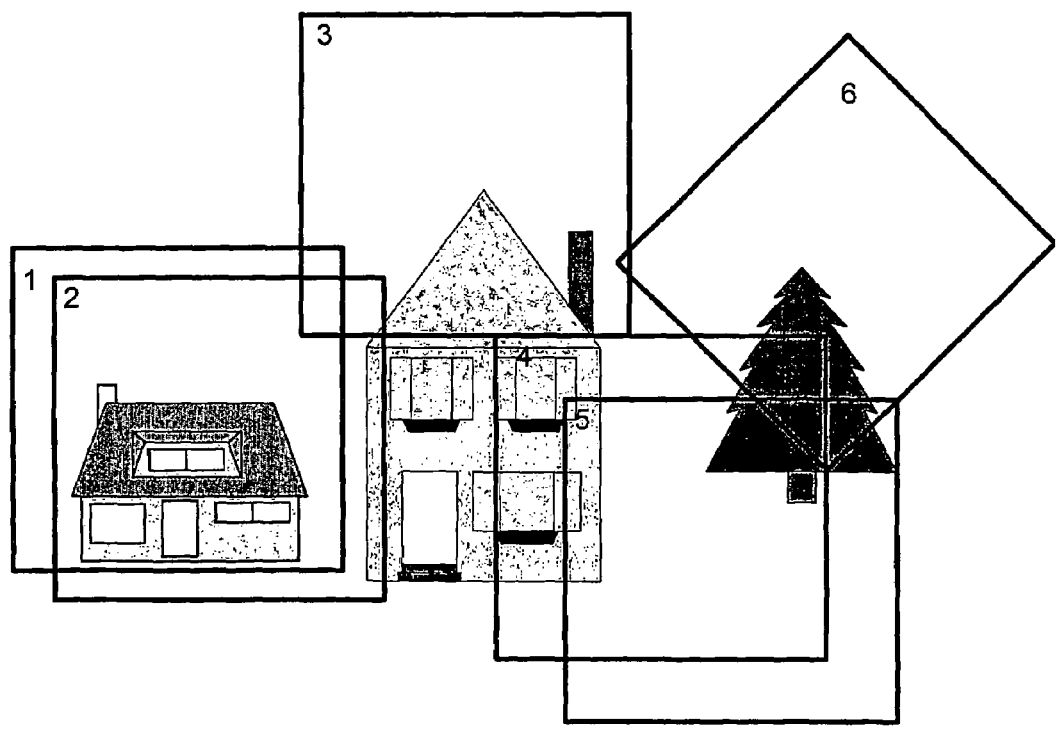
FIG. 4B schematically shows six consecutive frames of a video film illustrating the effect of motion of the lens.

FIG. 4B schematically shows six consecutive frames of a video film illustrating the effect of motion of the lens. Frame 2 nearly falls on frame 1 indicating that the camera has been held steady and moved slowly relative to the scene. Between frames 2 and 3, the camera has been raised abruptly and moves rapidly horizontally, in frames 4 and 5 it is slowly lowered, and in frame 6 rotated.

The method of the invention will now be described in general terms and the computational details will be described hereinbelow. The production of a stereoscopic series of images from a series of images of a scene is accomplished, according to the method of the invention, by using a processor unit to execute a series of computational steps.

In the first step, the original series of images is placed in a device that is capable of digitizing the images, if necessary, and storing the images in the memory of the processor for further processing. Commonly available equipment, including personal computers, provides suitable hardware with which to carry out the processing of the images. A subset, containing images of a scene of interest, is selected and, using algorithms from the field of computer vision, affine transformations describing the approximate motion from one image of the series to its neighboring one are computed and stored.

One image of the subset is selected from the memory and the remaining images of the subset are examined, starting with the immediate neighbors of the selected frame and continuing with the next image, until an image is found that satisfies a predetermined criterion that assures that the image being examined is suitable to be used as a stereo partner for the selected image. The search is carried out in both directions and limitations are put on the number of image that are checked in each direction to limit the computational requirements on the one hand and not to ultimately obtain results that, while computationally correct, will not result in a realistic three-dimensional image.

Once a suitable partner has been found, it is used together with the selected image and the cascaded affine transformation between them to calculate a planar transformation. This planar transformation is now applied to the suitable stereo partner to obtain a stereo pair composed of the selected image and the transformed suitable image found in the search.

The first stereoscopic pair has now been created and the process is now repeated for another image until suitable partners have been found for all of the images of the subset.

It will be clear to skilled persons that the computational details of the method can be carried out in alternate ways that will yield essentially equivalent results. For example, applying the method of the invention as described, the final stereo pair is composed of the originally selected image and of a transformed image of the partner found by applying the parallax criterion. Similarly, if the affine transformations between images i and j are represented by $A_{ij}$ then the transform between two images can be calculated directly between them at every stage of the calculation or can be calculated by cascading $A_{ij}$, $A_{jk}$, $A_{ki}$, etc. until the desired cascaded transform is achieved. In this last method the affine transformations between every neighboring pair of images in the subset is computed at the beginning of the calculation and stored in the memory for latter use.

The method of the invention is capable of producing the stereo pairs, even from a sequence of images taken with a hand-held camera as described hereinabove and containing all of the deviations from uniform motion of the camera relative to the scene discussed, as long as certain basic conditions are satisfied.

The most important of these conditions is that the original two-dimensional images must be recorded in a way which allows parallax between at least some of the images in the series. If, for example a camera is paned in a horizontal plane about a vertical axis passing through the optical center of the lens, then no parallax can exist between any of the images and the method of the invention can not be applied. If, however, the vertical axis is offset even by a small amount from the center of the lens, then there will be a translational component to the motion and parallax exists.

The degree of parallax that exists between two images is the criterion that is used to determine the appropriate choice of a partner that forms the stereo pair of a selected first image. Generally, the method uses the minimum amount of parallax that will result in satisfactory stereo pairs. If the amount of parallax is excessively large, then the result is unpleasing to the eye and also demands a great deal of computational effort and time. It has been found that in most cases a partner for any given image is found between 4 to 18 frames away, the number depending on the speed of motion of the camera relative to the scene. In applying the method of the invention, the operator supplies a parallax criterion. The parallax criterion is a number of pixels, which expresses the horizontal translational motion of the center of an image to its position in its partner image this number is determined from the affine transformation calculated between two images. At each step in the search for a suitable stereo partner to a given image the affine transform is determined, it the center of the image has moved less than the parallax criterion then the search continues to images progressively further away from the selected image until the motion is equal to or greater than the parallax parameter. If no suitable stereo partner is found within the allowed limits of the search then various computational methods can be used to overcome this problem. It has been found that simply using the image for which the transformation gives the closest agreement with the parallax criterion gives satisfactory results in virtually all cases and this is the method used in the preferred embodiment of the invention.

A second condition is that the motion of an object being photographed in the original sequence of images can not be too fast relative to the rate at which the images are recorded. If this is the case then there will be too much parallax between successive images to obtain acceptable results.

Another condition relates to motion of an object in the scene being photographed. In this case, the transformation of the images will be optimal either for the moving object or for the background—if for the background, then the object will be blurred, and vice versa. The slower the motion of the object the less this effect will be observed in the final stereo movie.

A final condition for optimal use of the method of the invention is concerned with the treatment of the images at the beginning and end of the subset. In this case there are either not enough or no neighboring images available in which to find a suitable stereo pair. Practically, this problem is satisfactorily overcome as described for the case of the parallax criterion.

Figure 5:
FIG. 5 is a series of images taken from consecutive frames of a video film taken with a hand-held commercial video camera.
Figure 5:
Figure 5:
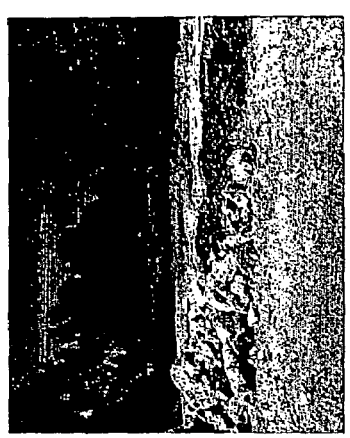
Figure 5:
Figure 5:
Figure 5:

FIG. 5 is a series of images taken from six consecutive frames of a video film taken with a hand-held commercial home video camera. These images represent a typical segment of a film that was made into a stereoscopic series of images using the method of the invention. The general logic of the algorithms employed in the preferred embodiment of the invention will now be discussed and the results of the transformations for a single stereo pair will be shown in FIG. 6.

The starting point is a given scene Z comprising n images, $Z=\{i_1, i_2, \ldots i_n\}$. An image registration technology algorithm [for an example of a suitable algorithm see, Brown, Lisa G., A Survey of Image Registration Technology, ACM Computing Surveys, December 1992, Vol. 24, No. 4, pp. 325–376.] is now applied to each image in the scene resulting in a collection of affine transformations between the images.

To limit the extent of the search for a suitable stereo partner for each image in the original scene, numbers s and f are chosen such that s>1 and f<n. For the images in the partial scene $Zs=\{i_s, i_{s+1}, \ldots i_f\}$, the stereoscopic pair is determined by cascading the previously determined affine transformations until the translational element of the cascaded transformation is equal to, or greater than, the parallax criterion.

As an example of how this last step is performed, we take image $i_k$ that is a member of partial scene Zs. The affine transformation from $i_k$ to image $i_{k-1}$ is determined. If the translational element of the transformation is equal to or greater than the parallax criterion, then $i_k$ and $i_{k+1}$ form a stereo pair. If not, and also the sign of the translational element is opposite to that of the parallax criterion, then the affine transformation from $i_k$ to $i_{k+1}$ is calculated. If the translational element of the transformation is equal to or greater than the parallax criterion, then $i_k$ and $i_{k+1}$ are a stereo pair, if not then the computations continue in the same manner until image $i_{k-j}$ (where j can be either positive or negative) which is suitable to form a stereo pair with $i_k$ is reached.

To the images of the chosen stereo pair is applied an algorithm to compute the planar transformation, $T_p$ between the two images [for an example of a suitable algorithm see: Burt, P. J. et. al., Object Tracking With Moving Camera, in Proceedings IEEE Workshop on Visual Motion 1989, pp. 2–12].

Now, for each image $i_k$, where s−1<k<f+1, the transformed image $i_{k'}$, where 0<k'<n, is obtained that is a stereo partner to $i_k$. Also the planar transformation $T_p(k)$ between them is obtained. Using this transformation the images k' are re-sampled, where k and k' are a stereo pair. The result of the sampling is the associated partial scene $Zs'=\{i_{s',i(s+1)'}, \ldots i_{f'}\}$. Synchronized projection of the partial scene and the associated partial scene alternately to the right and left eyes will give the illusion of three-dimensions.

Figure 6:
FIG. 6 shows the results of applying the method of the invention to one of the images shown in FIG. 5.
Figure 6:
Figure 6:
Figure 7:
FIG. 7 shows the stereo pairs for each of the images of FIG. 5.
Figure 7:
Figure 7:
Figure 7:
Figure 7:
Figure 7:
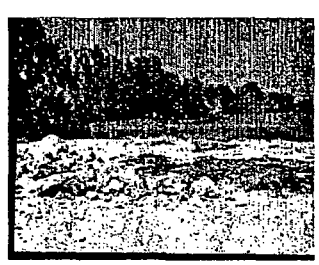
Figure 7:
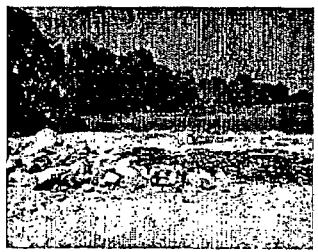
Figure 7:
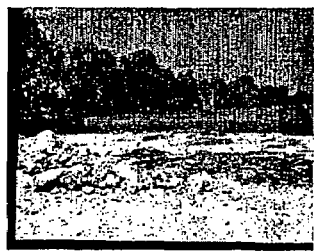
Figure 7:
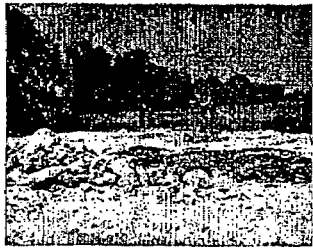
Figure 7:
Figure 7:
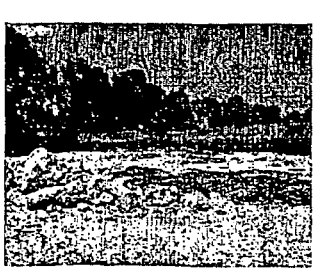
Figure 7:

FIG. 6 shows the results of applying the method of the invention to one of the images shown in FIG. 5. By use of the object tracking algorithm, it was decided that the appropriate stereo partner for the image in frame 1050 is that in frame 1054. Frame 1054*w* is the image of 1054 after transformation, so that 1050 and 1054*w* are the stereo pair that are presented, respectively, to the two eyes. FIG. 7 shows the stereo pairs for each of the images of FIG. 5.

The spectator observes the series of images with the aid of a suitable device to separately deliver the images of the stereoscopic pair to the appropriate eye. An example of such a viewing device is a pair of shuttered liquid crystal display (LCD) glasses such as those produced by Stereographics Corporation. These glasses work in synchronization with the computer or projector to alternately block one eye while the frame intended for the other eye is displayed. If the rate of projection is, for example 30 frames per second, i.e. 15 frames per second for each eye, then the image seen by the right eye is retained while the image of the left image is seen separately by left eye. The brain then fuses the two images to give the impression of a three-dimensional image from the pair of two-dimensional ones.

Because each of the original consecutive images becomes one member of the consecutive stereoscopic pairs in the stereoscopic movie produced by the method of the invention and the order of the images is maintained in the resulting movie, any sound track recorded with the original sequence of images can be reproduced essentially unchanged in the stereoscopic movie.

It is to be noted that the method "searches" the sequence of images in both directions to account for irregular motion of the camera relative to the scene. In addition, persons experienced in the art will know how to reduce the amount of computation time by, for example, skipping over repetitive frames where there is essentially no information disclosed that was not present in previous frames. Standard editing techniques can also be employed, for example to "smooth out" the stereoscopic film at places where there occur discontinuities in the original video.

Although embodiments of the invention have been described by way of illustration, it will be understood that the invention may be carried out with many variations, modifications, and adaptations, for example by using a different order and/or types of transformations, without departing from its spirit or exceeding the scope of the claims.

The invention claimed is:

1. A method for converting a sequence of monoscopic images to a sequence of stereoscopic images, comprising the following steps:
   a) processing the original sequence of monoscopic images of a scene by use of a device that is capable of reading the individual images, digitizing the images if necessary, and storing the images in a memory unit;
   b) selecting from said sequence a subset of images of interest;
   c) computing the collection of affine transformations between the adjacent images in the subset;
   d) selecting one image of the sequence of the subset of images of a scene that will be one member of the first stereo pair of the sequence;
   e) searching amongst the remaining images in said subset for a second image, which can be transformed into a suitable stereo partner for said selected image, by determining the cascaded affine transformation to each of the successive images starting with the neighboring image to said selected image and applying the parallax creation until said second image is found;
   f) calculating a planar transformation by using said selected image, said second image, and the cascaded affine transformation between them;
   g) applying said planar transformation to said second image;
   h) storing said selected image and the transformed second image in the memory unit; and
   i) repeating steps (c) through (h) for the next and each of the remaining images of said selected subset.

2. A method according to claim 1, wherein the sequence of monoscopic images is chosen from amongst the frames of a monoscopic movie passively acquired using a single video camera or from a collection of images taken with a video camera or a digital still camera.

3. A method according to claim 1, wherein the images comprising the sequence of monoscopic images are analog images that are scanned to produce digitized images.

4. A method according to claim 3, wherein the analog images can be images taken with a still or movie camera.

5. A method according to claim 1, wherein in steps (c), (e), and (f) the affine transformation is replaced by any other transform that is capable of estimating the relative position of the two cameras that produced the pair of images.

6. A method according to claim 1, wherein in step (f) the planar transformation is replaced by any other transform that is capable of estimating the relative positions of the two cameras that produced the stereo pair of images.

7. A method according to claim 1, wherein the parallax criterion is expressed as a number of pixels of horizontal translational motion.

8. A method according to claim 1, wherein the parallax criterion is expressed in terms of high order elements of the transformation.

9. A method according to claim 1, wherein the searching in step (e) is carried out amongst the neighboring images on both sides of the selected image.

10. A method according to claim 1, wherein the searching in step (e) is limited to a maximum number of images on either side of the selected image.

11. A method according to claim 1, wherein the searching in step (e) is carried out using a not-sequential search, which may have steps of variable length on one or both sides of the selected image and the cascaded affine or other transformation may be determined using only some of the successive images starting with the neighboring image to said selected image.

12. A stereoscopic movie according to claim 11 accompanied by a sound track, wherein said sound track is essentially identical to the sound track recorded with the sequence of monoscopic images from which said stereoscopic movie is produced.

13. A series of stereoscopic pair of images that are produced according to the method of claim 1 from a sequence of monoscopic images of a scene.

14. A stereoscopic movie produced from the series of stereoscopic pairs of images of claim 13.

* * * * *